United States Patent
Zhang et al.

(10) Patent No.: US 12,445,832 B2
(45) Date of Patent: Oct. 14, 2025

(54) CHANGE-OF-AUTHORIZATION SYNCHRONIZATION VIA CLOUD SERVICE

(71) Applicant: Hewlett Packard Enterprise Development LP, Spring, TX (US)

(72) Inventors: Youhe Zhang, Beijing (CN); Ruiyao Yang, Beijing (CN); Feng Ding, Beijing (CN); Le Wang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 471 days.

(21) Appl. No.: 18/168,697

(22) Filed: Feb. 14, 2023

(65) Prior Publication Data
US 2024/0276209 A1   Aug. 15, 2024

(51) Int. Cl.
| H04W 4/00 | (2018.01) |
| H04L 5/00 | (2006.01) |
| H04W 12/00 | (2021.01) |
| H04W 12/043 | (2021.01) |
| H04W 12/30 | (2021.01) |

(52) U.S. Cl.
CPC ......... *H04W 12/009* (2019.01); *H04L 5/0055* (2013.01); *H04W 12/043* (2021.01); *H04W 12/30* (2021.01)

(58) Field of Classification Search
CPC . H04W 12/009; H04W 12/043; H04W 12/30; H04L 5/0055
USPC ........................................................ 370/254
See application file for complete search history.

(56) References Cited

U.S. PATENT DOCUMENTS

| 6,769,000 | B1 | 7/2004 | Akhtar et al. |
| 7,079,499 | B1 | 7/2006 | Akhtar et al. |
| 7,720,024 | B2 | 5/2010 | Mahendran et al. |
| 7,929,556 | B2 | 4/2011 | Melia et al. |
| 8,554,178 | B1* | 10/2013 | Swaminathan ... H04W 36/0019 455/448 |
| 9,313,687 | B2 | 4/2016 | Knutson |
| 10,547,614 | B2 | 1/2020 | Gibbons et al. |
| 2004/0224681 | A1 | 11/2004 | Sjostrand |
| 2015/0006723 | A1* | 1/2015 | Sheth ................. H04L 47/2425 709/225 |

(Continued)

FOREIGN PATENT DOCUMENTS

| AU | 72368/00 A | 6/2001 |
| EP | 1111872 A2 | 6/2001 |

(Continued)

*Primary Examiner* — Mang Hang Yeung
(74) *Attorney, Agent, or Firm* — Hewlett Packard Enterprise Patent Department

(57) ABSTRACT

Implementations of the present disclosure relate to change-of-authorization (CoA) synchronization via a cloud service. A method at a server comprises receiving a CoA message indicating a CoA role of a mobile station from a first access point (AP) and storing the CoA role of the mobile station. The method further comprises receiving, from a second AP, an authentication message indicating the mobile station has been authenticated at the second AP. The method further comprises obtaining the CoA role of the mobile station and transmitting a CoA request, including the CoA role to the second AP. Implementations of the present disclosure can help the mobile station to obtain its correct CoA role automatically when roaming from a home AP to a target AP.

20 Claims, 6 Drawing Sheets

(56) References Cited

U.S. PATENT DOCUMENTS

2015/0016416 A1\* 1/2015 Hawkes ............ H04W 36/0016
370/331
2017/0214691 A1\* 7/2017 McCann ............. H04L 63/0435

FOREIGN PATENT DOCUMENTS

WO        00/14925 A2    3/2000
WO        01/19050 A2    3/2001

\* cited by examiner

CHANGE-OF-AUTHORIZATION SYNCHRONIZATION VIA CLOUD SERVICE

BACKGROUND

A Wireless Fidelity (Wi-Fi) system is a type of wireless local area network (WLAN) based on IEEE 802.11 standards and provides high-speed wireless data service to mobile stations located within a predetermined distance from an access point (AP) which may be a wireless access relay device. In the Wi-Fi system, a mobile station connects to an AP, completes authentication, and obtains its role. The role represents authorization information specifying network resources granted or denied to the mobile station. In the Wi-Fi system, mobile devices may have different levels of privilege, depending on their roles. An administrator of the Wi-Fi system may change the role of a particular mobile station and update it to the AP.

Wi-Fi roaming occurs when the mobile station moves outside the usable range of the AP and connects to a different AP. Recently developed APs can store and share the role of the mobile station. When the mobile station is roaming, the old AP can automatically synchronize the role to the new AP to provide seamless connectivity and a consistent user experience.

BRIEF DESCRIPTION OF THE DRAWINGS

Through the following detailed descriptions with reference to the accompanying drawings, the above and other objectives, features, and advantages of the example implementations disclosed herein will become more comprehensible. In the drawings, several example implementations disclosed herein will be illustrated in an example and in a non-limiting manner, where.

DETAILED DESCRIPTION

Figure 1:
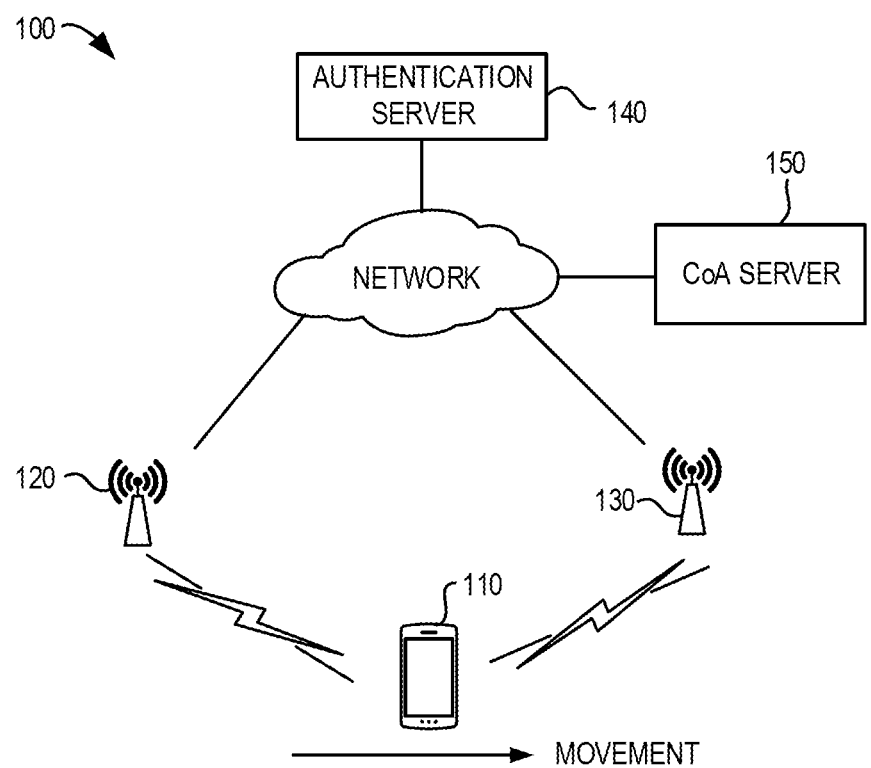
FIG. 1 illustrates a diagram of an example communication system in which example implementations of the present disclosure may be implemented.

As described above, the APs in a Wi-Fi system store the roles of the mobile stations. After a mobile station connects to a home AP and completes authentication, the home AP may obtain a default role in an authentication accept response from an authentication server. The administrator may send a CoA request from the authentication server to change the default role of the mobile station to a CoA role. For example, the administrator may promote the level of privilege of the mobile station. Accordingly, the home AP changes the role of the mobile station, and responds with a CoA Acknowledgement (ACK) message to the authentication server after the role is successfully changed to the CoA role.

When the mobile station roams to a target AP, the mobile station again performs authentication on the target AP and obtains the default role in an authentication accept response from the authentication server. In the meantime, the target AP requests the CoA role from the home AP for role synchronization. Specially, the target AP sends a roaming synchronization request to the home AP, and receives the roaming synchronization response carrying the CoA role. However, there is a timing issue, which may cause the role of the mobile station uncertain. The role at the target AP depends on which of the two responses arrives at the target AP first. If the authentication accept response arrives earlier than the roaming synchronization response, the target AP obtains a correct role, i.e., the CoA role. However, if the roaming synchronization response arrives earlier than the authentication accept response, the CoA role would be overwritten by the default role, which is incorrect.

There is another issue that the target AP and the home AP, in some scenarios, may be in different virtual local area networks (VLANs). The Layer 2 roaming messages cannot be synchronized across different VLANs. When the mobile station roams from the home AP to the target AP, the CoA role cannot be synchronized to the target AP through the roaming synchronization message(s).

In the above cases, the target AP cannot obtain the correct CoA role, and the administrator need to resend the CoA request manually, which is troublesome, especially, when there are a large number of mobile stations in the Wi-Fi system.

In view of the above, implementations of the disclosure provide a method for automatic CoA synchronization in a wireless communication system, for example, in a Wi-Fi system. The wireless communication system comprises multiple APs to provide wireless service to mobile stations. When a mobile station obtains a CoA role configured by an administrator, the corresponding AP saves the CoA role in a cloud server (also referred to as a CoA server). As the mobile roams to a new AP and completes authentication at the new AP, the new AP obtains the CoA role from the CoA server. In this way, the CoA role can be automatically synchronized in the communication system when roaming of the mobile station occurs, and the CoA role at the new AP can be guaranteed to be the latest and correct one.

Details of one or more implementations of the subject matter described in this disclosure are set forth in the accompanying drawings and the following description.

FIG. 1 illustrates a diagram of an example communication system 100 in which example implementations of the present disclosure may be implemented. Referring to FIG. 1, the communication system 100, according to an exemplary implementation, includes a mobile station 110, wireless access points (APs) 120 and 130, an authentication server 140, and a CoA server 150.

In some implementations, the mobile station 110 may be a terminal device configured to access the network (for example, the Internet) according to a Wi-Fi protocol via wireless AP 120 or 130. For example, the mobile station 110 may be a mobile phone, a multimedia computer, a multimedia tablet, an Internet node, a communicator, a laptop computer, a notebook computer, a netbook computer, a tablet computer, a personal communication system (PCS) device, a personal navigation device, a personal digital assistant (PDA), an audio/video player, a digital camera/video, a positioning device, a television receiver, a radio broadcast receiver, an electronic book device, a gaming device, a wearable device, or any other combinations thereof.

In some implementations, the wireless APs 120 and 130 may comprise, be implemented as, or known as a Radio Router, Radio Transceiver, switch, Wi-Fi hotspot device, BSS, Extended Service Set (ESS), Radio Base Station (RBS), or some other terminology. The wireless APs 120 and 130 may provide a wireless local area network (WLAN) for the mobile station 110 to access and communicate with other devices via the network. In some implementations, the wireless APs 120 and 130 may be located in the same geographic area, for example, in the same building or in the same city. In some implementations, the wireless APs 120 and 130 may belong to the same virtual local area network (VLAN). It should be noted that according to the 802.11 standards, a service set or extended service set (ESS) may refer to a group of wireless network devices that are identified by the same service set identifier (SSID) or "network name."

In some implementations, the authentication server 140 may correspond to an authentication, authorization, and accounting (AAA) server, which performs services such as Remote Authentication Dial-In User Services (RADIUS) in the communication system 100. The authentication server 140 may be local or remote to the wireless APs 120 and 130.

The authentication server 140 may receive authentication requests from the wireless AP 120 or 130, which may carry an identity of the mobile station 110. The identity of the mobile station 110 may be represented by medium access control (MAC) addresses of the mobile station 110. In some implementations, the identity may also be represented by an equipment identity, for example, International Mobile Equipment Identity (IMSI) or a username of the mobile station 110. The authentication server 140 may be configured to manage the identities of mobile stations in a database (DB), such as a hardware memory, and use the identity in the authentication request to authenticate the mobile station 110. If the mobile station 110 is successfully authenticated, the authentication server 140 may transmit the authentication accept message to the wireless APs 120 and 130.

During the authentication process, the authentication server 140 may obtain authorization information of the mobile station 110, and transmit it to the wireless APs 120 and 130 within the authentication accept messages. The authorization information may be a role of the mobile station, and the role may be represented by a filter-ID attribute or a vendor specific attribute (VSA). The filter-ID is a string of text corresponding to an access control list pre-configured on the wireless APs 120 and 130. As such, wireless APs 120 and 130 can control access of the mobile station 110 to network resources based on the role of the mobile station.

In addition, an administrator of the communication system 100 may adjust the role of the mobile station 110 at the wireless APs 120 and AP 130. For example, when the mobile station 110 is located within the coverage of the wireless AP 120, the administrator may operate to change the role of the mobile station 110 on the authentication server 140. Accordingly, the authentication server 140 transmits a CoA request, including the new role to the wireless AP 120. The wireless AP 120 may update the role of the mobile station 110 and responds with a CoA ACK. Afterward, the mobile station 110 may access network resources using the new role.

The CoA server 150 interworks with the wireless APs 120 and 130 and the authentication server 140 over the network to provide automatic authorization synchronization. The CoA server 150 may be configured to maintain the latest authorization information of the mobile station 110 in a database, and synchronize it to each working AP. For example, the mobile station 110 initially connects to the wireless AP 120 (hereafter "home AP 120"), and the home AP 120 obtains a CoA role from the authentication server 140. The CoA server 150 may receive the CoA role of the mobile station 110 and store the CoA role in the database. The mobile station 110 then moves into the coverage of the wireless AP 130 and connects to the wireless AP 130 (hereafter, "target AP 130"). The CoA server 150 may, when it knows the mobile station 110 has completed authentication on the target AP 130, retrieve the CoA role and transmit the CoA to the target AP 130.

As an example, the target AP 130 may transmit an authentication message to the CoA server 130, indicating that the authentication is done at the target AP 130. In response to this message, the CoA server 150 synchronizes the local CoA role of the mobile station 110 to the target AP 130. As described above, the default role of the mobile station 110 is transmitted in the authentication accept response from the authentication server 140. Thus, the CoA role arrives later than the default role, avoiding the target AP 130 from obtaining an incorrect role.

It is to be understood that the numbers of wireless APs, mobile stations, and various servers in FIG. 1 are only for the purpose of illustration without suggesting any limitations. The example communication system 100 may include any suitable number of wireless APs, mobile stations, and servers configured for implementations of the present disclosure.

Communications in the example environment 100 may operate according to the wireless communication protocols such as the Institute of Electrical and Electronic Engineers (IEEE) 802.11 standards, Wi-Fi Alliance Specifications, or any other wireless communication standards. The IEEE 802.11 standards may include the IEEE 802.11ax standard, or any other wireless communication standards.

By use of the CoA server as a cloud service, when the mobile station roams over wireless APs, the CoA role of the mobile station can be automatically synchronized from a cloud service to the target AP. In addition, by avoiding the timing issue between default role and the CoA role, the target AP can certainly obtain the correct role of the roaming mobile station. Some example implementations of the present disclosure will be discussed in detail below with reference to other figures.

Figure 2:
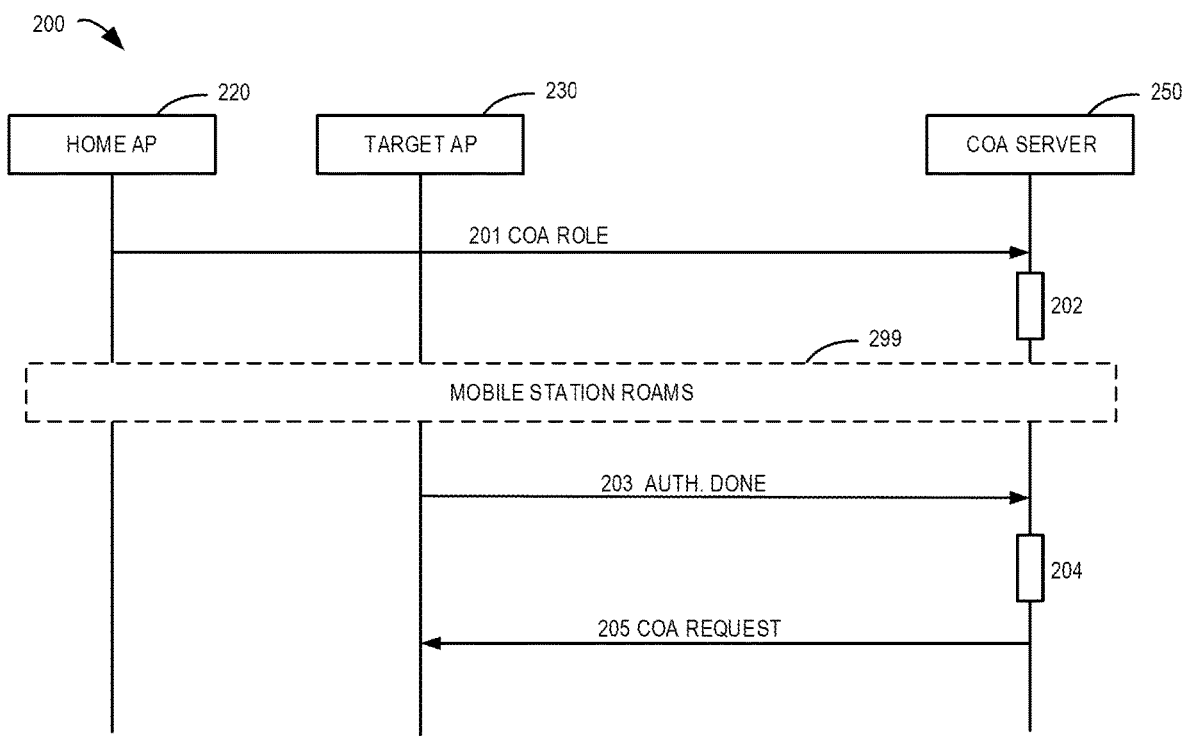
FIG. 2 illustrates a signaling flow for automatic CoA synchronization via a cloud service in accordance with some example implementations of the present disclosure.

FIG. 2 illustrates a signaling flow for automatic CoA synchronization via a cloud service in accordance with some example implementations of the present disclosure. For the purpose of discussion, the signaling flow 200 will be described with reference to FIG. 1.

At 201, a home AP 220 transmits a CoA role of the mobile station (such as a mobile station 110) to a CoA server 250. The mobile station is connected to the home AP 220. The CoA role of the mobile station may be transmitted in a CoA message to the CoA server 250 periodically or when the home AP 220 detects an update of the CoA role of the mobile station.

In some implementations, the administrator of the communication system may adjust the access policy of the mobile station, and cause the authentication server to transmit a CoA request to the home AP 220. The home AP 220 changes the role of the mobile station accordingly. Once the role is changed successfully, the home AP 220 transmits the CoA message including the CoA role to the CoA server 250.

In some implementations, the home AP 220 may transmit the CoA role immediately after the mobile station has been authenticated successfully. The home AP 220 may receive the role of the mobile station from the authentication server during authentication and may apply it at the home AP 220. By doing this, the CoA role in use at the home AP 220 is transmitted to the CoA server 250.

At 202, the CoA server 250 extracts and stores the CoA role in the database. In some implementations, the CoA role may be transmitted together with the identity of the mobile station and a group identity of the home AP 220. With the group identity, the CoA role of the mobile station may be shared in a group of APs. The CoA server 250 may store the CoA role, the identity of the mobile station, and the group identity in one entry. Thus, the mobile station may have different CoA roles for different groups of APs. For example, the group may consist of multiple APs in the same building. When the mobile station roams in the building, all of the APs may use the same CoA role for the mobile station.

At 299, the mobile station roams to a target AP 230 by movement, and authentication may be required at the target AP 230. After the mobile station has been successfully authenticated at the target AP 230, at 203, the target AP 230 transmits an authentication done message to the CoA server 250.

The authentication done message may include the identity of the mobile station for querying the CoA role at the CoA server 250. In some implementations, if CoA roles are stored together with group identities of mobile stations, the authentication done message may further include the group identity of the target AP 230.

At 204, the CoA server 250 searches in the database and obtains the CoA role of the mobile station. The CoA role at the CoA server 250 is a backup of the role used at other AP(s), such as the home AP 220, so it is the correct role of the mobile station. If no CoA role is found, the CoA server 250 may not respond to the message from the target AP 230. In this case, the target AP 230 would fail to obtain the CoA role. It may request the CoA role from the previous AP of the mobile station, i.e., the home AP 220, for example, using a roaming synchronization message.

If the CoA server 250 finds a match of role in the database, at 205, the CoA server 250 transmits a CoA request, including the CoA role, to the target AP 230. The CoA role in the CoA request may be a filter-ID attribute. The filter-ID attribute may be a string of text and may correspond to a pre-configured access control list (ACL) at the AP.

The target AP 230 may extract the filter-ID attribute from the CoA request and looks for the corresponding ACL. If there is a match, the target AP 230 applies the ACL to the mobile station, and thus the CoA role is successfully updated at the target AP 230. The target AP 230 may transmit a CoA Acknowledgement (ACK) message to the CoA server 250. If the CoA server 250 does not receive the CoA ACK message, it may retransmit the CoA request after a period of time.

According to implementations of the disclosure, the authorization information, such as the CoA role of the mobile station, is cached at the CoA server. When the mobile station roams in the wireless communication system, the new AP can automatically obtain the authorization information from the CoA server after the authentication of the mobile station is completed. The new AP does not need to obtain the CoA role from the old AP, which avoids being overwritten by the incorrect role during authentication.

Figure 3:
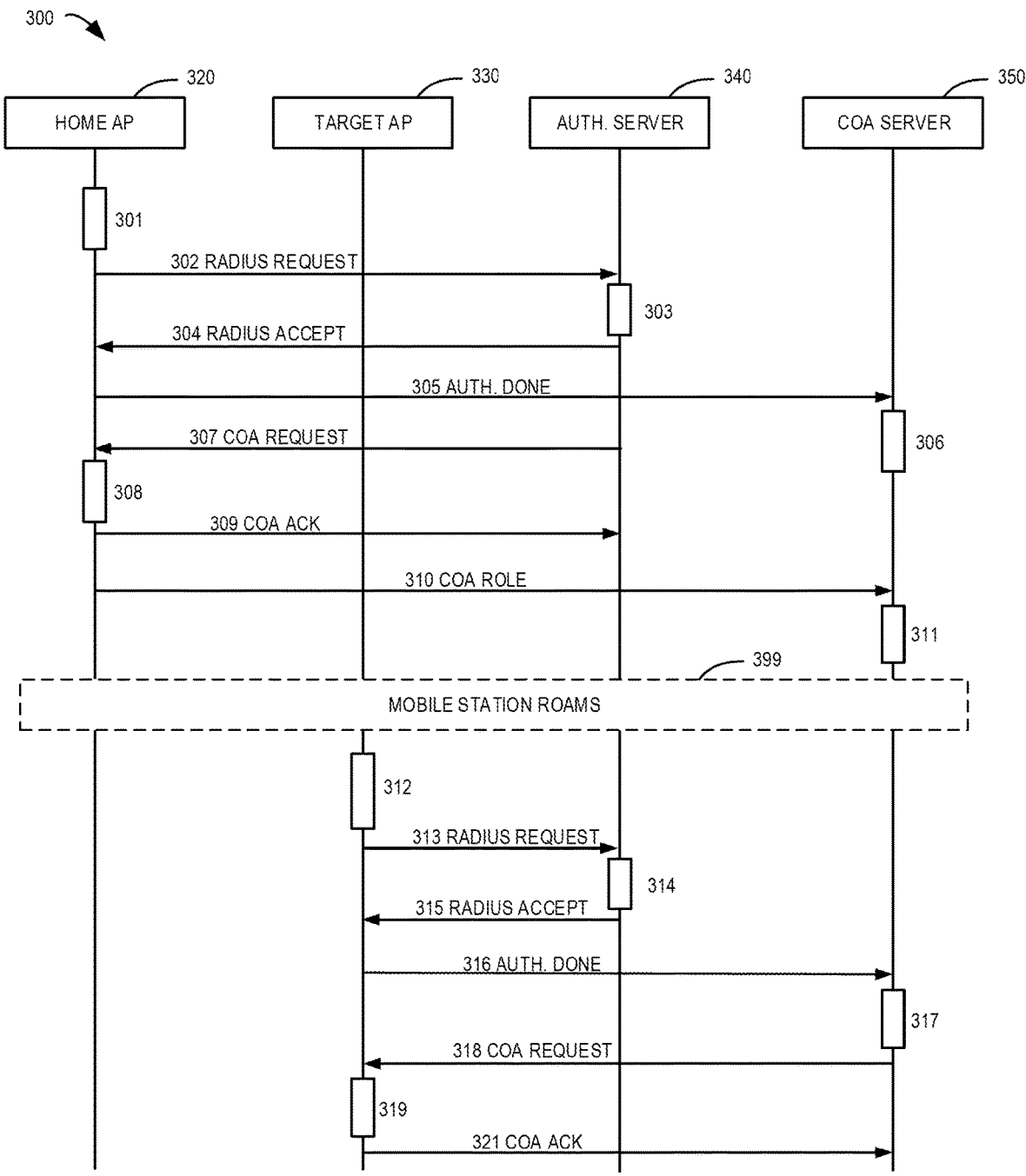
FIG. 3 illustrates another signaling flow for automatic CoA synchronization via a cloud service in accordance with some example implementations of the present disclosure.

FIG. 3 illustrates another signaling flow 300 for automatic CoA synchronization via a cloud service in accordance with some example implementations of the present disclosure. For the purpose of discussion, the signaling flow 300 will be described with reference to FIG. 1.

At 301, the mobile station (such as a mobile station 110) connects to a home AP 320. When the mobile station is powered on or moves into the coverage of the home AP 320, it tries to establish a connection with the home AP 320. A user of the mobile station may select the wireless network provided by the home AP 320, for example, clicking a WLAN name (e.g., SSID)) on display on the mobile station. The mobile station transmits an access request, including its identity, to the home AP 320 for connection. The identity of the mobile station may be the physical address, such as a MAC address of the mobile device, and the home AP 320 may verify whether the mobile station has been authenticated.

If the mobile station is connecting to the home AP 320 for the first time, the home AP 320 may ask the mobile station to provide user credentials, for example, a username and password. The home AP 320 collects authentication information, such as user credentials, and performs authentication with the authentication server 340.

At 302, the home AP 320 transmits a RADIUS Request message to the authentication server 340, and the RADIUS Request message may comprise the authentication information. According to RADIUS protocols, the home AP 320 may use a shared secret in the request, and the authentication information is encrypted in the RADIUS request.

At 303, the authentication server 340 performs authentication on the mobile station. In some implementations, the authentication server 340 may first check whether the shared secret in the request is correct. If not, the authentication server 340 may discard the RADIUS Request message. Then, the authentication server 340 may look at the authentication method requested in the RADIUS Request message.

If the RADIUS Request message uses an allowed authentication method, the authentication server 340 may obtain the user credentials from the RADIUS Request message and look for a match in a user database. If the username and password match an entry in the database, the authentication server 340 can get additional information about the user from the user database. In some implementations, the authentication server 340 may check whether it has an access policy that matches the user of the mobile station. If such policy exists, the authentication server will send a response to the home AP 320.

If the RADIUS Request message meets all the previous conditions, the authentication server 340 may store the identity of the mobile station, for example, the physical address in the database. The authentication server 340 may use the identity of the mobile station for accelerating the authentication process in the future.

At 304, the authentication server 340 transmits a RADIUS Accept response to the home AP 320. The authentication server 340 may use the shared secret for any response it sends. If the shared secret does not match, the home AP 320 may reject the RADIUS response.

In some implementations, the RADIUS Accept response may include an role of the mobile station to indicate the access policy for the mobile station. In some implementations, the role may be a filter-ID attribute or a vendor specific attribute (VSA). The filter-ID attribute is a string of text that gives an identifier of a pre-configured ACL at the access points. The home AP 320 may extract the role from the RADIUS Accept response and control the network resource that the mobile station can access. The role in the RADIUS Accept response may be a default role which usually has a relatively low level of privilege. With the default role, the mobile station may only have limited access to network resources.

At 305, the home AP 320 transmits an Authentication Done message to the CoA server 150. The CoA server 350 may operate as a cloud service on the Internet. With the authentication done message, the home AP 320 notifies the CoA server 150 that the mobile station has completed the authentication at the current AP, such as the home AP 320. In some implementations, this message may be used as a CoA role query from the home AP 320. The authentication done message may include the identity of the mobile station. The CoA server 350, on receipt of the authentication message, will check whether a CoA role of the mobile station is stored in the database.

At 306, the CoA server 350 searches for the CoA role of the mobile station using the identity in the authentication message. If a CoA role of the mobile station is found, the CoA server 350 may communicate the CoA role to the current AP. If no CoA role is found, the CoA server 350 may not respond. Suppose that the mobile station connects the home AP 320 and has completed the authentication in the communication system for the first time, the CoA server does not have a CoA role of the mobile station.

The RADIUS CoA feature provides a mechanism to change the attributes of the mobile station after the mobile station is authenticated. When the policy changes for the user or the mobile station, the administrator may operate on the authentication server 340 to reinitialize the authentication and apply the new policy.

At 307, the authentication server 340 transmits a CoA request to the home AP 320. The CoA request may include the new CoA role configured by the administrator. In some implementations, the new CoA role may be represented by a filter-ID attribute. The filter-ID may be a string of text and correspond to an access control list that is pre-configured on the access points.

At 308, the home AP 320 updates the role of the mobile station according to the CoA request. The home AP 320 obtains the filter-ID attribute in the CoA request and applies the corresponding ACL to the mobile station. The mobile station now has an updated CoA role different from the default role and has a different level of privilege to network resources.

At 309, the home AP 320 transmits a CoA Acknowledgement (ACK) message to the authentication server 340. After the home AP 320 has successfully updated the CoA role of the mobile station, it notifies the administrator of the communication system that the CoA operation is completed. If the home AP 320 fails to apply the CoA role, it may transmit a CoA non-acknowledgment (NACK) message to the authentication server 340. The mobile station completes authentication and obtains the latest CoA role at the target AP 330.

At 310, the home AP 320 transmits a CoA message, including the CoA role, to the CoA server 350. The home AP 320 uses the CoA message to store or cache the CoA role of the mobile station at the CoA server 350. The CoA message may comprise an identity of the mobile station and the CoA role in use. The identity may be, for example, a physical address, a username, or an equipment identity of the mobile station, which may uniquely identify the mobile station or its user.

In some implementations, the CoA role may be configured to be applicable for an access point group consisting of multiple access points. Access points in the same group may share the CoA role for a particular mobile station. The access points in the same AP group may be located in the same geographic area, for example, in the same building or in the same city. Additionally, or alternatively, the access points in the same AP group may belong to the same virtual local area network. In some implementations, the CoA message may further comprise a group identity of the home AP 320, which means that the CoA role at the home AP 320 may be used for other APs in the same group of the home AP 320. By doing this, when the mobile station roams over the group of access points, each of the access points in the group can obtain the latest CoA role of the mobile station.

At 311, the CoA server 350 stores the received CoA role in a database. After receiving the CoA message from the home AP 320, the CoA server 350 may obtain the CoA role together with the identity of the mobile station, and may store the CoA role and the identity in the database. In some implementations, the CoA server 350 may obtain the group identity of the home AP 320 (if exists), and store it together with the CoA role of the mobile station.

Next, at 399, the mobile station roams from the home AP 320 to the target AP 330. For example, the home AP 320 may be deployed at a meeting room in a building, and the user of the mobile station leaves the meeting room, out of the coverage of the home AP 320. The user then enters a coffee bar where the target AP 330 is deployed. By the roaming mechanism, at 312, the mobile station connects to the target AP 330 successfully. The target AP 330 and the home AP 320 are configured to provide the same WLAN. In this case, the mobile station may connect to the target AP 330 automatically, and the user of the mobile station is not required to select the SSID of the WLAN to establish the connection manually. Since the mobile station is a new device to the target AP, the target AP 330 does not have authentication information for the mobile station, so it needs to authenticate the mobile station by interacting with the authentication server 340.

At 313, the target AP 330 transmits a RADIUS request to the authentication server 340. At this time, the RADIUS request may include the identity of the mobile station. In some implementations, the username and password may be omitted from the request.

At 314, the authentication server 340 performs authentication on the mobile station. The authentication server 340 may obtain the identity of the mobile station and look for a match in the database. If the identity exists, the authentication server 340 may determine that the mobile station has been authenticated and may obtain the access policy of the mobile station and other information for the session. If the authentication server does not have the identity in the database, it may notify the target AP 330 to collect the user credentials, such as username and password, such that it will authenticate the mobile station from scratch.

When the mobile station has been authenticated, at 315, the authentication server 340 transmits a RADIUS Accept response to the target AP 330. In some implementations, the RADIUS Accept response may include a default role of the mobile station to indicate a default access policy. As described, the role may be a filter-ID attribute corresponding to an identifier of a pre-configured ACL at the target AP 330. Alternatively or additionally, the role may be a vendor specific attribute (VSA).

At 316, the target AP 330 transmits an authentication done message to the CoA server 350. After receiving the RADIUS Accept response, the target AP 330 determines that the mobile station has been successfully authenticated. In this case, the target AP 330 transmits the authentication done message to the CoA server 350.

With the authentication done message, the target AP 330 notifies the CoA server 350 that the mobile station has completed the authentication at the target AP 330. The authentication done message may be regarded as a CoA role query from the target AP 330. The authentication message may include the identity of the mobile station. In some implementations, the authentication message may include a group identity of the target AP 330.

At 317, the CoA server 350 searches for the CoA role of the mobile station. If a CoA role of the mobile station is found, the CoA server 350 may transmit the CoA role to the target AP 330. If no CoA role is found, the CoA server 350 may not respond. Alternatively, the CoA server 350 may respond to notify the target AP 330 to obtain the CoA role from other APs (such as the home AP 320) as a backup.

In some implementations, the CoA server 350 may obtain the group identity of the target AP 330 and the identity of the mobile station in the authentication done message and retrieve the CoA of the mobile station based on the group identity and the identity of the mobile station. By doing this, the CoA server 350 can obtain the correct CoA role for the target AP 330.

At 318, the CoA server 350 transmits a CoA request to the target AP 120. The CoA request includes the CoA role stored at the CoA server. In some implementations, the CoA role may be represented by a filter-ID attribute, which corresponds to an access control list at the target AP 330.

At 319, the target AP 330 updates the role of the mobile station according to the CoA request. The target AP 330 obtains the filter-ID attribute in the CoA request and applies the corresponding ACL to the mobile station. The mobile station now has an updated CoA role different from the default role and has a different level of privilege to network resources.

At 321, the target AP 330 transmits a CoA Acknowledgement (ACK) message to the CoA server 350. After the target AP 330 has successfully updated the CoA role of the mobile station, it notifies the CoA server 350 that the latest and correct CoA role has been synchronized. If the target AP 330 fails to apply the CoA role, it may transmit a CoA non-acknowledgment (NACK) message to the CoA server 350.

In some implementations, the CoA server 350 may determine whether a CoA ACK message is received after the CoA request is transmitted. If no CoA ACK is received during a time interval (timeout), the CoA server 350 may retransmit the CoA request. The retransmission may be performed a number of times. If the CoA role still cannot be synchronized to the target AP 330, the CoA server may notify the target AP 330 to obtain the CoA role from the home AP 320. For example, if the CoA server 350 is not accessible for some reasons, the target AP 330 can obtain the CoA role through a Lay 2 roaming message.

It will be appreciated that the APs in the communication system 100 may operate as the home AP and the target AP. In FIGS. 2 and 3, the home AP 320 operates as the home AP of the mobile station, and may operate as a target AP in a different scenario. The target AP 330 operates as a target AP of the mobile station, and may operate as a home AP in a different scenario. Thus, the APs in the communication system can be configured to perform all of the actions by the home AP and the target AP as shown in FIGS. 2 and 3.

According to implementations of the disclosure, the APs in the communication system can cache the latest CoA roles of the mobile stations on the CoA server as backup. When a mobile station is roaming in the communication system, a new AP can retrieve, after the authentication is completed, the CoA role of the mobile station from the CoA server. As compared with the traditional CoA synchronization, which obtains the CoA role from the old AP, it avoids the CoA role being possibly overwritten by the default role in the authentication due to the timing issue. The implementations of the disclosure can advantageously guarantee the new AP to obtain the correct CoA automatically. In addition, the implementations of the disclosure are also applicable to scenarios where the roaming messages between APs are unavailable, as long as the APs support the Internet service to access the CoA server.

Several example implementations have been discussed above with respect to FIGS. 1-3. An additional example implementation regarding an example process at the CoA server will be described with respect to FIG. 4 below.

Figure 4:
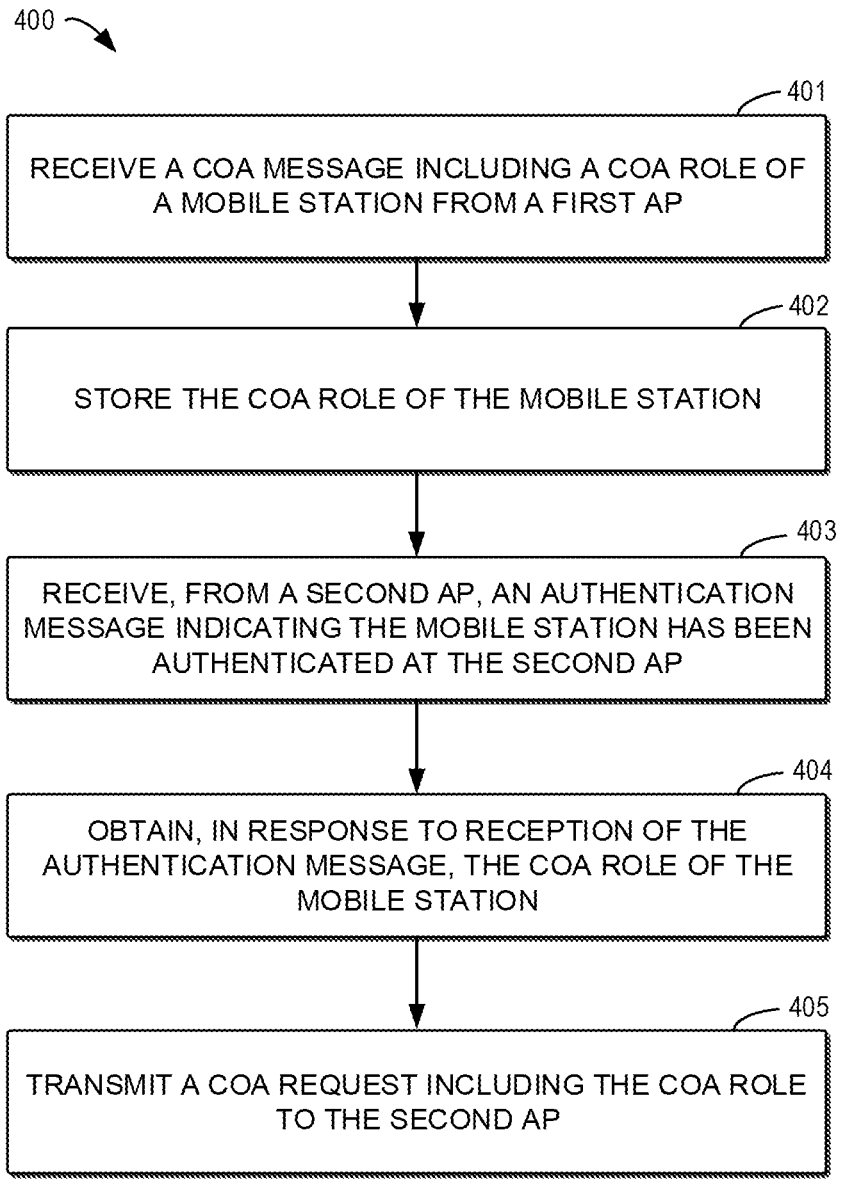
FIG. 4 illustrates a flowchart of a CoA synchronization method in accordance with some example implementations of the present disclosure.

FIG. 4 illustrates a flowchart of a method 400 in accordance with some example implementations of the present disclosure. The method 400 may be performed by the CoA server 150, 250, or 350 according to the implementations as described herein. While only some blocks are shown in the method 400, the method 400 may comprise other operations in addition to those described herein.

At 401, the CoA server receives a CoA message including a CoA role of a mobile station from a first AP. The first AP may be the home AP 120, 220, and 320, as shown in FIGS. 1-3, and the mobile station may be the mobile station 110, as shown in FIG. 1. In some implementations, the CoA message may comprise a filter-ID attribute indicative of the CoA role. The filter-ID attribute may define an identifier of a pre-defined access control list (ACL) of the mobile station 110.

In some implementations, the CoA message may be triggered by the change of the role of the mobile station 110 at the first AP. For example, the administrator may manually change the role at the authentication server, and the first AP receives a CoA request, including the CoA role from the authentication server, requesting a change of the role of the mobile station at the first AP. After the role of the mobile station 110 at the first AP has been changed to the CoA role, the first AP 120 may transmit the CoA message indicating the CoA role to the CoA server.

At 402, the CoA server stores the CoA role of the mobile station. In some implementations, the CoA server may store the CoA role of the mobile station 110 in a database of the CoA server. In some implementations, the CoA server may store the CoA role together with the identity of the mobile station 110, e.g., a media access control (MAC) address. Additionally, or alternatively, the identity of the mobile station may be equipment identity of the mobile station. Additionally, or alternatively, the identity of the mobile station may be a username logged on the mobile station.

In some implementations, the first AP may have a group identity. The CoA server may store the CoA role together with the group identity of the first AP and the identity of the mobile station 110.

At 403, the CoA server receives, from a second AP, an authentication message indicating that the mobile station has been authenticated at the second AP. The second AP may be the target AP 130, 230, or 330, as shown in FIGS. 1-3. In some embodiments, the target AP may transmit the authentication message to the CoA server after it has completed the authentication of the mobile station 110.

At 404, the CoA server obtains the CoA role of the mobile station in response to the reception of the authentication message. The CoA server may search the database for the CoA role of the mobile station 110. For example, it may a query with the identity of the mobile station 110. In some implementations, the CoA server may determine a group identity of the second AP and an identity of the mobile station, and retrieve the CoA role of the mobile station based on the group identity and the identity of the mobile station in the query.

At 405, the CoA server transmits a CoA request, including the CoA role, to the second AP. Accordingly, the second AP receives the CoA request from the CoA server and changes the default role of the mobile station at the second AP to the CoA role. After the role has been successfully changed at the second AP, the second AP may transmit a CoA ACK message to the server.

In some implementations, the CoA server 150 may determine whether a CoA ACK message is received during a time interval after the CoA request is transmitted. If no CoA ACK is received, the CoA server 150 may retransmit the CoA request, including the CoA role, to the second AP after the time interval.

Figure 5:
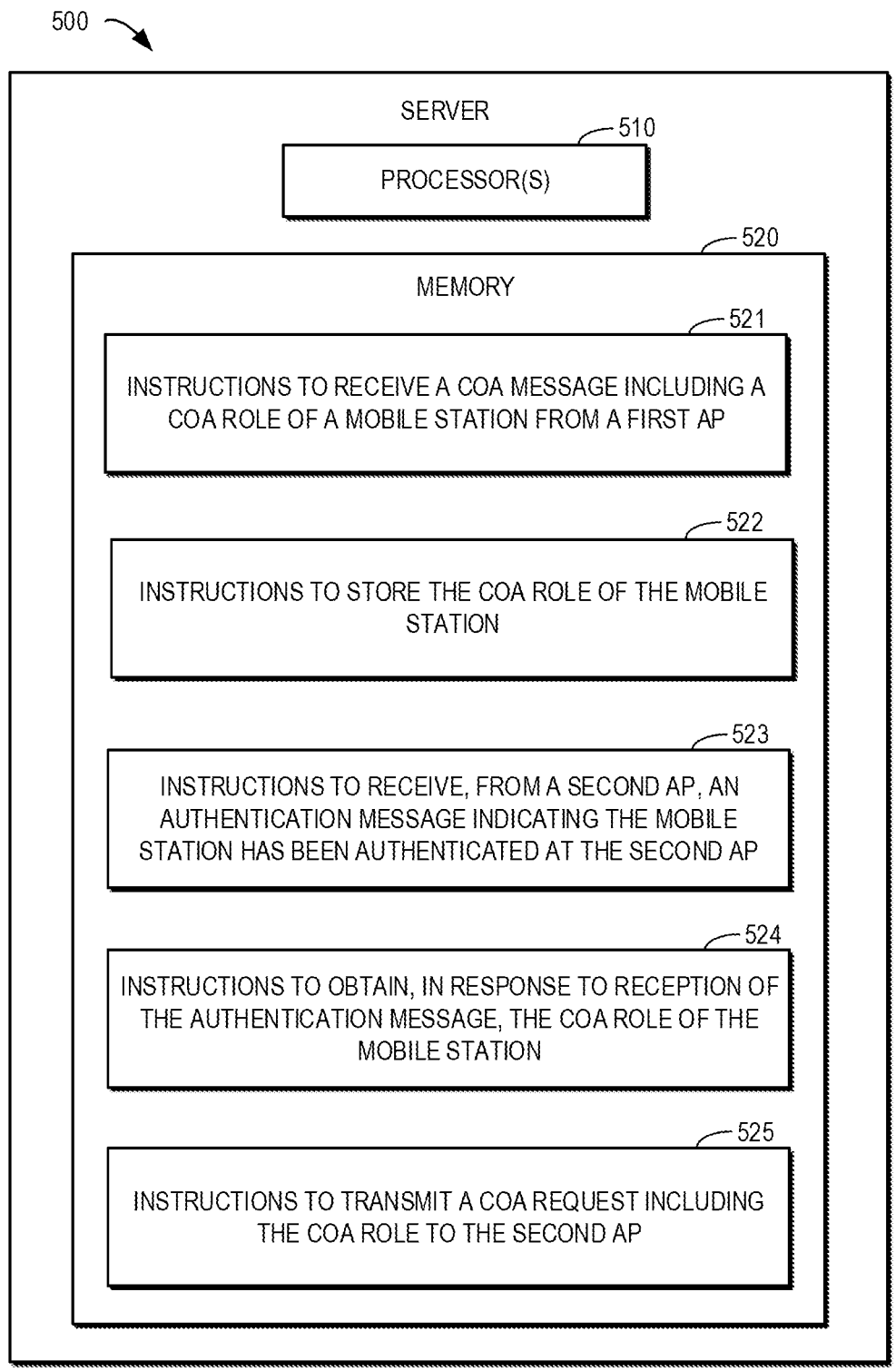
FIG. 5 illustrates a block diagram of an example server in accordance with some example implementations of the present disclosure.

FIG. 5 illustrates a block diagram of an example server 500 in accordance with some example implementations of the present disclosure. The example server 500 comprises at least one processor 510 and a memory 520 coupled to the at least one processor 510. The memory 520 stores instructions to cause the at least one processor 510 to implement actions of the method according to implementations of the present disclosure. The example server 500 may be used to implement the CoA servers 150, 250, and 350, as shown in FIGS. 1-3.

As illustrated in FIG. 5, the memory 520 stores instructions 521 to, receive a CoA message indicating a CoA role of a mobile station from a first AP. The memory 520 further stores instructions 522 to store the CoA role of the mobile station. The memory 520 further stores instructions 523 to receive, from a second AP, an authentication message indicating the mobile station has been authenticated at the second AP. The memory 520 further stores instructions 524 to obtain the CoA role of the mobile station in response to the reception of the authentication message. The memory 520 further stores instructions 525 to transmit a CoA request, including the CoA role to the second AP.

Figure 6:
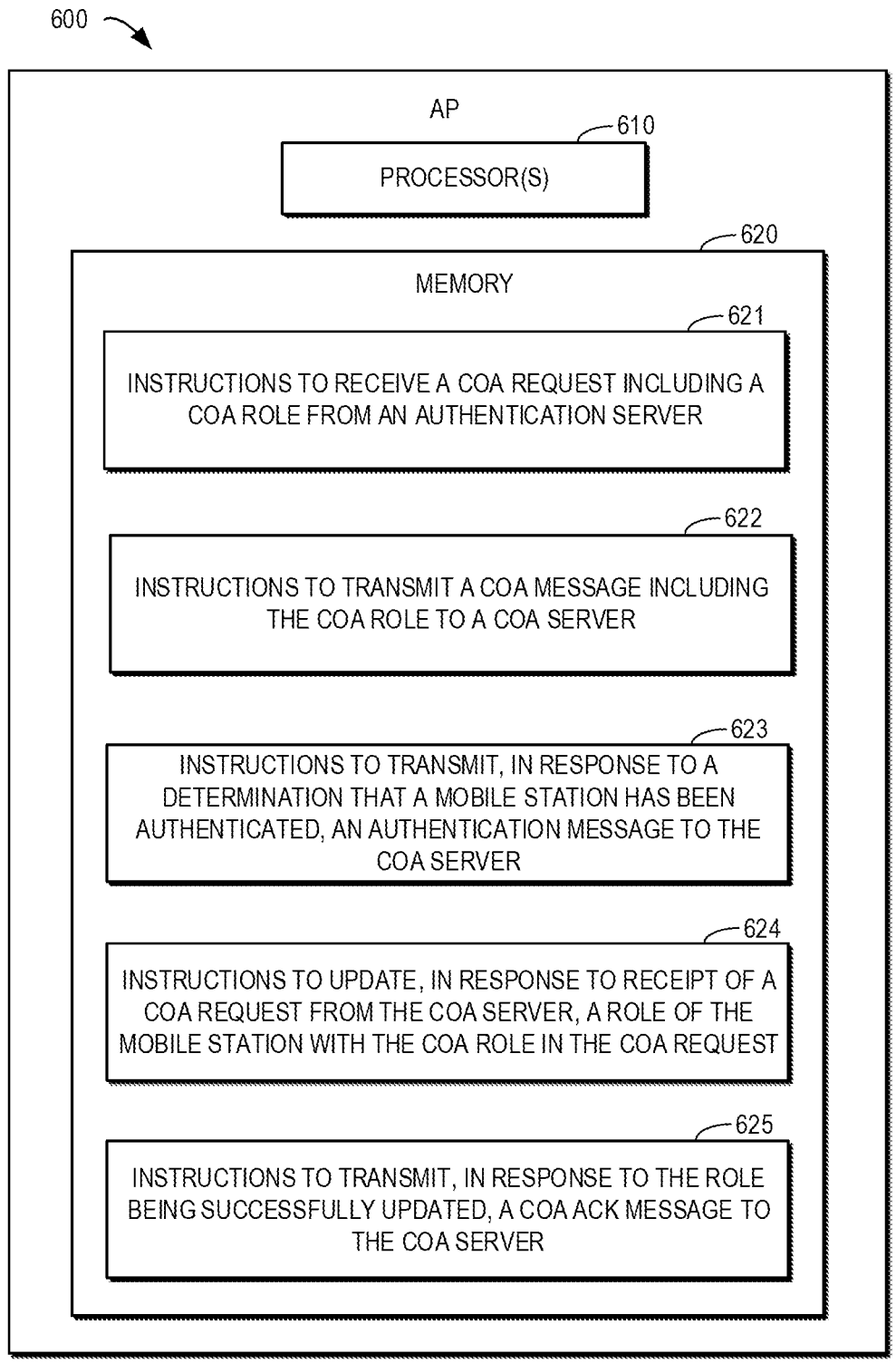
FIG. 6 illustrates a block diagram of an example AP in accordance with some example implementations of the present disclosure.

FIG. 6 illustrates a block diagram of an example AP 600 in accordance with some example implementations of the present disclosure. The example AP 600 comprises at least one processor 610 and a memory 620 coupled to the at least one processor 610. The memory 620 stores instructions to cause the at least one processor 610 to implement actions of the method according to implementations of the present disclosure. The example AP 600 may be used to implement any of the wireless access APs including the home AP 120, 220, and 320, and the target AP 130, 230, and 330 as shown in FIGS. 1-3.

As illustrated in FIG. 6, the memory 620 stores instructions 621 to receive a CoA request including a CoA role from an authentication server. The authentication server may be the authentication server 140 or 340 as shown in FIGS. 1 and 3. The memory 620 further stores instructions 622 to transmit a CoA message indicating the CoA role to a CoA server. The CoA server may be the CoA server 150, 250, or 350 as shown in FIGS. 1-3. The instructions 621 and 622 may be executed when the AP 600 operates as the home AP 120, 220, or 320.

The memory 620 further stores instructions 623 to transmit, in response to a determination that a mobile station has been authenticated, an authentication message to the CoA server. The mobile station may be the mobile station 110 that roams from the home AP onto the target AP, as shown in FIG. 1. The memory 620 further stores instructions 624 to update, in response to receipt of a CoA request from the CoA server, a role of the mobile station with the CoA role in the CoA request. The memory 620 further stores instructions 625 to transmit, in response to the role being successfully updated, a CoA ACK message to the CoA server. The instructions 623, 624 and 625 may be executed when the AP 600 operates as the target AP 130, 230, or 330.

The present disclosure also provides at least one computer program product tangibly stored on a non-transitory computer-readable storage medium. The computer program product includes program codes or instructions which can be executed to carry out the method as described above.

While the above discussion used a Wi-Fi communication standard as an illustrative example, in other implementations, a wide variety of communication standards and, more generally, wireless communication technologies may be used. Furthermore, while some of the operations in the foregoing implementations were implemented in hardware or software, in general, the operations in the preceding implementations can be implemented in a wide variety of configurations and architectures. Therefore, some or all of the operations in the foregoing implementations may be performed in hardware, software, or both.

It should be noted that specific terms disclosed in the present disclosure are proposed for convenience of description and a better understanding of example implementations of the present disclosure, and the use of these specific terms may be changed to another format within the technical scope or spirit of the present disclosure.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

In the context of this disclosure, a computer-readable medium may be any tangible medium that may contain, or store a program for use by or in connection with an instruction execution system, apparatus, or device. The computer-readable medium may be a computer-readable signal medium or a computer-readable storage medium. A computer-readable medium may include but is not limited to an electronic, magnetic, optical, electromagnetic, infrared, or semiconductor system, apparatus, or device, or any suitable combination of the foregoing. More specific examples of the computer-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method, comprising:
receiving, by a server and from a first access point (AP), a Change-of-Authorization (CoA) message including a CoA role of a mobile station
storing, by the server, the CoA role of the mobile station;
receiving, by the server and from a second AP, an authentication message indicating that the mobile station has been authenticated at the second AP;
in response to receiving the authentication message, obtaining, by the server, the CoA role of the mobile station; and
transmitting, by the server and to the second AP, a CoA request including the CoA role.

2. The method of claim 1, wherein the authentication message is transmitted from the second AP to the server in response to the mobile station having been authenticated at the second AP.

3. The method of claim 1, wherein a role of the mobile station at the second AP is updated with the CoA role in response to the CoA request being transmitted from the server.

4. The method of claim 3, further comprising:
determining whether a CoA Acknowledgement (ACK) message is received from the second AP; and
in response to a determination that no CoA ACK is received during a time interval, retransmitting the CoA request including the CoA role to the second AP.

5. The method of claim 1, wherein the CoA message is received from the first AP in response to a role of the mobile station at the first AP having been changed to the CoA role.

6. The method of claim 1, wherein the first AP has a group identity, and storing the CoA role of the mobile station comprises:
storing the CoA role together with the group identity of the first AP.

7. The method of claim 1, wherein the first and second APs are located in a same geographic area, or belong to a same virtual local area network.

8. The method of claim 6, wherein obtaining the CoA role of the mobile station comprises:
determining a group identity of the second AP and an identity of the mobile station; and
retrieving the CoA role of the mobile station based on the group identity of the second AP and the identity of the mobile station.

9. The method of claim 1, wherein the CoA message includes one or more of:
a filter-ID attribute indicating the CoA role and corresponding to an identifier of a pre-defined access control list (ACL); or
a vendor specific attribute (VSA).

10. The method of claim 1, wherein the CoA message includes one or more of:
a media access control (MAC) address of the mobile station;
an equipment identity of the mobile station; or
a username logged on the mobile station.

11. A server comprising:
at least one processor; and
a memory coupled to the at least one processor, the memory storing instructions to cause the at least one processor to implement acts comprising:
receiving, from a first access point (AP), a Change-of-Authorization (CoA) message including a CoA role of a mobile station;
storing the CoA role of the mobile station;
receiving, from a second AP, an authentication message indicating the mobile station has been authenticated at the second AP;
obtaining, in response to receiving the authentication message, the CoA role of the mobile station; and
transmitting a CoA request including the CoA role to the second AP.

12. The server of claim 11, wherein the authentication message is transmitted from the second AP to the server in response to the mobile station having been authenticated at the second AP.

13. The server of claim 11, wherein a role of the mobile station at the second AP is updated with the CoA role in response to the CoA request being transmitted from the server.

14. The server of claim 13, the acts further comprising:
determining whether a CoA Acknowledgement (ACK) message is received from the second AP; and
in response to a determination that no CoA ACK is received during a time interval, retransmitting the CoA request including the CoA role to the second AP.

15. The server of claim 11, wherein the CoA message is received from the first AP in response to a role of the mobile station at the first AP having been changed to the CoA role.

16. The server of claim 11, wherein the first AP has a group identity, and storing the CoA role of the mobile station comprises:
storing the CoA role together with the group identity of the first AP.

17. The server of claim 11, wherein the first and second APs are located in a same geographic area, or belong to a same virtual local area network.

18. The server of claim 16, wherein obtaining the CoA role of the mobile station comprises:
determining a group identity of the second AP and an identity of the mobile station; and
retrieving the CoA role of the mobile station based on the group identity of the second AP and the identity of the mobile station.

19. The server of claim 11, wherein the CoA message includes one or more of:
a filter-ID attribute indicating the CoA role and corresponding to an identifier of a pre-defined access control list (ACL); or
a vendor specific attribute (VSA).

20. A non-transitory computer-readable medium comprising instructions stored thereon which, when executed by a server, cause the server to:
receive a Change-of-Authorization (CoA) message including a CoA role of a mobile station from a first Access Point (AP);
store the CoA role of the mobile station;

receive, from a second AP, an authentication message indicating the mobile station has been authenticated at the second AP;
obtain, in response to reception of the authentication message, the CoA role of the mobile station; and
transmit a CoA request including the CoA role to the second AP.

* * * * *